United States Patent [19]

Toman

[11] Patent Number: 4,877,838

[45] Date of Patent: Oct. 31, 1989

[54] HIGH SOLIDS COATINGS WITH REACTIVE EPOXY ESTER DILUENT

[75] Inventor: Perry A. Toman, Medina, Ohio

[73] Assignee: The Glidden Company, Cleveland, Ohio

[21] Appl. No.: 289,257

[22] Filed: Dec. 23, 1988

Related U.S. Application Data

[63] Continuation-in-part of Ser. No. 147,440, Jan. 25, 1988, Pat. No. 4,182,523.

[51] Int. Cl.$^4$ ............................................. C08L 63/00
[52] U.S. Cl. ..................................... 525/107; 524/512; 525/155; 525/161; 525/162
[58] Field of Search ............... 525/107, 155, 161, 162; 524/512; 260/DIG. 45

[56] References Cited

U.S. PATENT DOCUMENTS

| | | | |
|---|---|---|---|
| 4,397,989 | 8/1983 | Adesko | 525/162 |
| 4,751,267 | 6/1988 | Berghoff | 525/108 |

*Primary Examiner*—Theodore E. Pertilla
*Attorney, Agent, or Firm*—Thomas M. Schmitz

[57] ABSTRACT

A high solids protective coating composition based on a coreactive thermosetting binder comprises low molecular weight hydroxyl functional acrylic copolymer, low molecular weight hydroxyl functional polyester polymer, hydroxy ester functional epoxy ester diluent, and a coreactive crosslinking amine material.

13 Claims, No Drawings

HIGH SOLIDS COATINGS WITH REACTIVE EPOXY ESTER DILUENT

BACKGROUND OF THE INVENTION

This is a continuation-in-part of application Ser. No. 147,440 filed Jan. 25, 1988, now Pat. No. 4,812,523 issued 3/14/89, which is incorporated herein by reference.

This invention relates to high solids thermosetting protective coatings and particularly to a blend of polyester and acrylic copolymer for use in high solids coatings further containing a hydroxyl functional epoxy ester diluent. High solids coatings are non-aqueous coatings containing minor amounts of organic solvents and are particularly useful as coatings on appliances, aluminum extrusions, general metal surfaces, and wood substrates.

Acrylic polymers are known to generally provide useful coatings exhibiting good film properties. These polymers can contain reactive functional groups which are coreactive with other polymers or resins to provide thermosetting binder systems. Such acrylic binders can be produced by solution or bulk polymerization of ethylenically unsaturated monomers including acrylic monomers. Solvent can be added in minor amounts to render the acrylic polymer fluent. Various acrylic polymers have been suggested to provide high solids polymeric compositions such as disclosed in U.S. Pat. No. 4,374,164, or combined other polymers such as suggested in U.S. Pat. No. 4,397,989 or U.S. Pat. No 4,369,283. Commonly assigned U.S. Pat. No. 4,716,200 issued Dec. 29, 1987 discloses low molecular weight acrylic copolymers combined with low molecular weight polyester polymer to provide high solids coatings whereas U.S. Pat. No. 4,397,989 discloses a high molecular weight acrylic copolymer in conjunction with a polyester polymer to provide acrylic high solids coatings.

Reactive diluents are described in U.S. Pat. No. 4,022,726 and U.S. Pat. No. 4,417,022, which described hydroxy functional ester containing diluents. These diluents are characterized as having one primary or secondary hydroxyl group and have a retained solids value of greater than 80 percent by weight. Although reactive diluents reduce the viscosity of high solids coatings but unfortunately, film integrity and film performance properties such as weathering, salt spray, and water fog are diminished.

It now has been found that a reactive epoxy ester diluent in a high solids polyester/acrylic coating provides a highly desirable viscosity profile without diminishing film integrity properties. The high solids coating containing the reactive epoxy ester diluent reduces viscosity, improves liquid and cured film properties, enables a wide range of formulations with very low levels of volatile organic solvents, and generally improves paint film properties in comparison to unmodified paint films. A further advantage has been found in that epoxy ester diluent containing hydroxyl functionality exhibits excellent retention within the cured paint film while not adversely effecting the final coating appearance and cured paint film physical properties. These and other advantages of this invention will become more apparent by referring to the detailed description of the invention as well as the illustrative examples.

SUMMARY OF THE INVENTION

Briefly, the invention comprises a coating composition based on an acrylic copolymer and a polyester polymer as the binder combined with a hydroxyl functional epoxy ester diluent. On a weight basis, the polymeric binder for a high solids coating can contain between 5% and 60% hydroxyl functional epoxy ester diluent additive based on the binder system comprising an acrylic copolymer, a polyester polymer, and a hydroxyl ester functional epoxy ester diluent.

DETAILED DESCRIPTION OF THE INVENTION

This composition comprises a high solids coating comprising a reactive acrylic copolymer, a reactive polyester polymer, and a hydroxyl ester functional epoxy ester diluent.

Referring first to the acrylic binder, the acrylic polymer comprises an organic solvent solution or bulk copolymerized ethylenically unsaturated monomers, including acrylic monomers, to produce a non-aqueous acrylic polymer containing reactive primary hydroxyl groups and having a number average molecular weight between 500 and 2500, and preferably between 900 and 1200. Number average molecular weights are measured by gel permeation chromatography (GPC) according to ASTM methods such as D3016-72; D3536-76; D3593-80; or D3016-78. The acrylic polymers are liquid at room temperature and generally have a Tg between $-20°$ C. and $+20°$ C. as calculated by the Fox equation based on the ratio of specific monomers. The hydroxyl number of the acrylic polymer is broadly between 50 and 200 and preferably between 100 and 150. The acrylic polymer can be produced by bulk polymerization of ethylenically unsaturated monomers including acrylic monomers, activated by peroxide or azo or other free radical initiator at polymerization temperatures typically between 70° C. to 170° C. and preferably between 120° C. to 150° C. Typically 0.5 to 2% peroxide initiator is utilized based on the weight of the monomers. Typical polymerization initiators can include for instance benzoyl peroxide, t-butyl hydroperoxide, tertiary butyl perbenzoate, cumene peroxide and similar peroxide polymerization catalysts which are preferred. Other initiators include azo initiators such as azo bis isobutyronitrile and persulfate or ammonium persulfates.

Copolymerizable ethylenically unsaturated monomers useful in producing the acrylic copolymer are monomers containing carbon-to-carbon unsaturation and include vinyl monomers, acrylic monomers, allylic monomers, acrylamide monomers, and mono- and dicarboxylic unsaturated acids. Vinyl esters include vinyl acetate, vinyl proprionate, vinyl butyrates, vinyl benzoates, vinyl isopropyl acetates and similar vinyl esters. Vinyl halides include vinyl chloride, vinyl fluoride, and vinylidene chloride. Vinyl aromatic hydrocarbons include styrene, methyl styrenes and similar lower alkyl styrenes, chlorostyrene, vinyl toluene, vinyl naphthalene, divinyl benzoate, and cyclohexene. Vinyl aliphatic hydrocarbon monomers include alpha olefines such as ethylene, propylene, isobutylene, and cyclohexene as well as conjugated dienes such as 1,3 butadiene, methyl-2-butadiene, 1,3-piperylene, 2,3 dimethyl butadiene, isoprene, cyclopentadiene, and dicyclopentadiene. Vinyl alkyl ethers include methyl vinyl ether, isopropyl vinyl ether, n-butyl vinyl ether, and isobutyl vinyl ether. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl and cresyl glycidyl ethers reacted with acrylic and methacrylic acids, hydroxyl alkyl acrylates and methacrylates such as hydroxyethyl and hydroxypropyl acrylates and methacrylates, as well as amino acrylates and methacrylates. Acrylic acids include acrylic and methacrylic acid, ethacrylic acid, alpha-chloracrylic acid, alpha-cycanoacrylic acid, crotonic acid, beta-acryloxy propionic acid, and betastryl acrylic acid. Olefinic unsaturated acids include fumaric acid, maleic acid or anhydride, haconic acid, citraconic acid, mesaconic acid, muconic acid, glutaconic acid, aconitic acid, hydrosorbic acid, sorbic acid, alpha-chlorosorbic acid, cinnamic acid, and hydromuconic acid as well as esters of such acids. Ethylenically unsaturated carboxylic acid amides and derivatives can be added in very minor amounts up to 5% and can include acrylamides or methacrylamides such as N-methylol acrylamide, N-ethanol acrylamide, N-propanol acrylamide, N-methylol methacrylamide, N-ethanol methacrylamide, and similar alkyl acrylamide or methacrylamide monomers containing methyl, ethyl, propyl, n-butyl or iso-butyl alkyl groups.

Hydroxyl containing monomers are hydroxy containing ethylenically unsaturated monomers including hydroxyl alkyl acrylates such as 2-hydroxy ethyl acrylate and methacrylate, 2-hydroxypropyl acrylate and methacrylate, and similar hydroxy alkyl acrylates. On a weight basis, the monomers comprise at least 5% and preferably between 5% and 95% acrylic monomer, between 5% and 30% hydroxyl monomer, and the remainder being acrylic and/or other ethylenic monomers to provide an acrylic copolymer having an Acid No. between 1 and 30 and a Hydroxyl No. between 50 and 200.

Typical solvents useful in preparing the acrylic copolymer, if desired, can include for instance, toluene, ethyl acetate, acetone, methylisobutyl ketone, methyl n-amyl ketone, methylisoamyl ketone, ethylamyl ketone, amyl acetate, methylethyl ketone, ethyl alcohol, mineral spirits, ethylene glycol monoethyl ether acetate, and other aliphatic, cycloaliphatic and aromatic hydrocarbon, esters, ethers, ketones and alcohols. After the polymerization is completed, solvents can be stripped off to increase the polymer solids content of the resulting polymer solution.

Preferred acrylic high solids compositions comprise an acrylic copolymer in conjunction with a linear polyester polymer to form the high solids acrylic binder component of the coating.

Referring next to the polyester component of the polymeric mixture, the polyester polymer is a low molecular weight linear polymer having a number average molecular weight measured by GPC between about 250 and 2,000 and preferably between 400 and 1,000 based on number average. Linear aliphatic, non-ether type glycols are esterified with considerably lesser molar amounts of aromatic dicarboxylic acid and a linear saturated dicarboxylic acid having between 2 and 10 linear carbon atoms such as adipic, azelaic, succinic, glutaric, pimelic, suberic or sebacic acid to produce low molecular weight polyesters. Preferred and commercially available linear saturated dicarboxylic acids are adipic or azelaic acid. Aromatic dicarboxylic acids (anhydrides) include phthalic, isophthalic, terephthalic, and tetrahydrophthalic. Isophthalic is preferred for superior films exhibiting detergent, salt spray and corrosion resistance. Suitable glycols include non-ether linear aliphatic glycols having 2 to 8 carbon atoms such as 1,3 or 1,4 butylene glycol, 1,6 hexane diol, neopentyl glycol, propylene glycol and similar linear glycols. Preferred glycol is neopentyl glycol. The molar excess of the glycol over the lesser molar amounts of aromatic and linear saturated dicarboxylic acid is between about 10% and 80% and preferably between about 20% and 60%. On a molar basis, the preferred low molecular weight polyester polymer comprises between 0.1 and 0.5 moles of aromatic dicarboxylic acid and 0.5 and 0.1 moles of linear saturated dicarboxylic acid per 1 mole of glycol. Hence, the polyester contains considerable excess unreacted hydroxyl groups to provide a hydroxy polyester having a hydroxyl number between 115 and 285 and preferably between 175 and 240. The polyester contains free carboxyl groups imparting an acid number that is preferably below 15 and typically between 5 and 10 mg KOH per gram of polyester. Glycol can be esterified with minor amounts of up to about 5% by weight of unsaturated dicarboxylic acids (anhydrides) including maleic, fumaric or itaconic acids; or monocarboxylic acids such as acetic, propyl-, and higher chain aliphatic acids up to about 8 carbon atoms. The polyester component can be produced by solvent or bulk polymerization although bulk polymerization is preferred. The raw materials can be charged in bulk and esterification polymerized at temperatures typically between 190° C. to 240° C. although moderately higher or lower temperatures can be utilized satisfactorily. An esterification catalyst can be used, typically at less than 1% levels based on charge, such as an organo tin compound.

Referring next to the hydroxy ester functional epoxy ester diluent, the reactive epoxy ester comprises an ester reaction product of an epoxide functional resin and a carboxylic acid. For instance, suitable epoxy ester diluents can be produced by reacting a mono-functional or difunctional or higher functional epoxide resin with a mono-functional or difunctional or polyfunctional carboxylic acid. Epoxy functional resins are characterized by the three-membered ether group

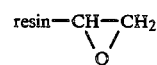

commonly referred to as an epoxy or oxirane group, where such groups typically terminate epoxy backbone chains and/or branched chains. Epoxy ester groups are formed by esterification of an epoxy group with a carboxyl functional material (R—COOH) to produce a hydroxy ester functional group on the epoxy ester as follows:

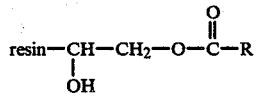

Useful epoxide functional resin comprise conventional epoxy resins, glycidyl functional resins, and alkylene oxide resins.

Epoxy resins are predominantly linear chain molecules comprising the coreaction product of polynuclear dihydroxy phenols or bisphenols with halohydrins to produce epoxy resins containing at least one and preferably two epoxy groups per molecule. The most common bisphenols are bisphenol-A, bisphenol-F, bisphenol-S, and 4,4' dihydroxy bisphenol, with the most preferred being bisphenol-A. Halohydrins include epichlorohydrin, dichlorohydrin, and 1,2-dichloro-3-hydroxypropane with the most preferred being epichlorohydrin. Preferred epoxy resins comprise the coreaction product of excess molar equivalents of epichlorohydrin with bisphenol-A to produce predominantly an epoxy group terminated linear molecular chain of repeating units of diglycidyl ether of bisphenol-A containing between 2 and 25 repeating copolymerized units of diglycidyl ether of bisphenol-A. In practice, an excess molar equivalent of epichlorohydrin are reacted with bisphenol-A to produce epoxy resins where up to two moles of epichlorohydrin coreact with one mole of bisphenol-A, although less than complete reaction can produce difunctional epoxy resin along with monoepoxide chains terminated at the other end with a bisphenol-A unit. The most preferred linear epoxy resins are polyglycidyl ethers of bisphenol-A having terminating 1,2-epoxide groups and an epoxy equivalent weight between 140 and 525, and a number average molecular weight from about 280 to 1,250 as measured by gel permeation chromatography (GPC). Commercially available lower molecular weight epoxy resins include Dow Chemical epoxy resins identified by trade number and average molecular weights as follows: DER 333 (380); DER 661 (525); while Shell Chemical epoxy resins are EPON 828 (380); EPON 836 (625); EPON 1001 (525). Although not as common, trifunctional epoxy resins are useful comprising branched chain epoxy resins where the branched chains as well as the backbone chain are each terminated with a terminal epoxide group to provide greater than two epoxide functionality. Trifunctional epoxy resins can be produced by coreacting epichlorohydrin with polynuclear polyhydroxy phenols, trifunctional phenols, or aliphatic trifunctional alcohols.

Glycidyl functional resins are copolymers produced by copolymerizing ethylenically unsaturated monomers including glycidyl or oxirane functional monomers. Oxirane monomers characteristically contain functionality as well as pendant ethylenic double bond unsaturation and includes, for example, acrylic, methacrylic, or vinyl derivatives of glycidol. Preferred oxirane monomers contain pendant oxirane and include glycidyl acrylate, glycidyl methacrylate, and allyl glycidyl ether. The oxirane monomers can be copolymerized with ethylenically unsaturated monomers which include, for example, vinyl aromatic and aliphatic hydrocarbons such as styrene, alpha-methyl styrene and similar substituted styrenes, vinyl naphthalene, vinyl toluene, divinyl benzene, and vinyl aliphatic hydrocarbons such as 1,3-butadiene, methyl-2-butadiene, 2,3-dimethyl butadiene, cyclopentadiene and dicyclopentadiene as well as ethylenically unsaturated esters and acids such as acrylic methacrylic, ethacrylic, cinnamic and crotonic and the like and esters containing fumaric and maleic type unsaturation. Particularly preferred monomers include, for example, styrene, alpha-methyl styrene, tertiary butyl styrene, divinyl benzene, 1,3-butadiene, isoprene, alkyl acrylates such as ethyl acrylate, butyl acrylate, methyl-methacrylate, acrylonitrile, vinyl acrylate, and vinyl methacrylate as well as similar ethylenically unsaturated monomers. Vinyl esters include vinyl acetate, vinyl propionate, vinyl butyrates, vinyl benzoates, vinyl isopropyl acetates and similar vinyl esters. Vinyl alkyl ethers include methyl vinyl ether, isopropyl vinyl ether, n-butyl vinyl ether, and isobutyl vinyl ether. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids, hydroxyl alkyl acrylates and methacrylates such as hydroxyethyl and hydroxypropyl acrylates and methacrylates, as well as amino acrylates and methacrylates. On a weight basis, the ethylenically unsaturated monomers can include between 2% and 50% oxirane monomer and between 98% and 50% other ethylenically unsaturated monomers. The glycidyl functional copolymer has a molecular weight of broadly between 500 and 4,000, and preferably between 800 and 1,500 based on number average molecular weight. Number average molecular weights are typically measured by GPC according to ASTM methods such as D3536-76; D3593-80; or D3016-78.

Alkylene oxide resins are epoxide functional resins comprising an alkylene oxide adduct of a bisphenol compound. The alkylene oxide is an aliphatic alkyl derivative having up to about 26 carbon atoms although preferred oxides are lower alkyl oxides such as ethylene, propylene, and butylene oxides. Bisphenol compounds include bisphenol-A, bisphenol-F and bissulfone or sulfides. Typically two or more moles of alkylene oxide are coreacted with one mole of bisphenol compound. Preferred compositions are 2:1 molar reactions. Suitable molecular weight range of alkylene oxide resins is between 200 and 1,000 as measured by GPC.

The foregoing epoxy resin, glycidyl copolymer resins, and alkylene oxide resins are coreacted with mono-, di, or polyfunctional carboxylic acid compounds in accordance with this invention to produce an hydroxyl ester functional epoxide diluent. Monocarboxylic acids include: formic acid, acetic acid, propanoic acid, butanoic acid, 2-methylpropanoic acid, pentanoic acid, 3-methylbutanoic acid, 2,2-dimethyl-propanoic acid, hexanoic acid, heptanoic acid, octanoic acid, nonanoic acid, decanoic acid, dodecanoic acid, tetradecanoic acid, hexadecanoic acid, octadecanoic acid, nonacosanoic acid, and similar lower and higher fatty acids, saturated or unsaturated, as well as aromatic benzoic acid, o-, p-, m-, toluic acid, salicyclic, and m- and p- hydroxybenzoic acid. Suitable linear carboxylic acids include oxalic acid, malonic acid, succinic acid, glutaric acid, adipic acid, pimelic acid, suberic acid, azelaic acid, and sebacic acid. Aromatic dicarboxylic and polybasic acids include phthalic acid and anhydride, isophthalic acid, terephthalic acid, 1,3,5-trimesic acid, hexahydrophthalic acid. Particularly useful carboxylic acid materials include aliphatic monocarboxylic acids such as 2-ethylhexanoic acid and lauric acid, aliphatic dicarboxylic acid such as dodecanedioic acid, and dimer fatty acids such as dimerized oleic acid.

Accordingly, hydroxy ester functional epoxy ester diluents are produced by coreacting mono- or difunctional or higher epoxide functional resins with mono-, di, or polyfunctional carboxylic acid compounds to form the hydroxy ester group in the epoxy ester diluents.

The foregoing hydroxy ester functional epoxy ester diluent, acrylic polymer, and polyester polymer can be combined with a coreative amine derivative cross-linking resin such as aminoplast including glycolurils. Examples of useful aminoplast resins are the reaction products of ureas and melamines with aldehydes further etherified with an alcohol. Examples of aminoplast resin components are urea, ethylene urea, thiourea, melamine, benzoguanamine. Aldehydes useful in this invention are formaldehyde, acetaldehyde and propionaldehyde, although formaldehyde is clearly preferred. The aminoplast resins can be used in the alkylol form but, most preferably, are utilized in the ether form by etherifying with a monohydric alcohol containing from 1 to about 8 carbon atoms. In a melamine molecule, for instance, up to 3 of the 6 active hydrogens on the amine group can be advantageously substituted with an alkanol group having 1-8 carbon atoms. Higher levels such as 6 substitution can be used as in Cymel 300 (1,3,5-triazine-2,4,6-triamine polymer) which contains 6 substituted methylol groups. The alkanol groups stabilize the melamine or other amine derivative under ordinary temperature, but enable reaction at higher temperatures. Preferred substitutions are between 2 and 4 substitutions to avoid popping or solvent entrapment with a fast curing film. Examples of aminoplast resins are methylol urea, dimethoxymethylol urea, butylated polymeric urea-formaldehyde resins, hexamethoxymethyl melamine, methylated polymeric melamine formaldehyde resin and butylated polymeric melamine formaldehyde resin. Glycoluril derivatives are disclosed in U.S. Pat. No. 4,064,191 and are also known as acetylendiureas. Glycolurils are derived by reacting two moles of urea with one mole of glyoxal to provide a complex ring structure where substitute constituents can be a hydrogen, or a lower alkyl radical, or can be methylolated partially or fully by reacting with 1 to 4 moles of formaldehyde to provide a methylol glycoluril. The preparation of various glycolurils is illustrated in U.S. Pat. No. 4,064,191 such as tetramethylol glycoluril, tetrabutoxymethyl glycoluril, partially methylolated glycoluril, tetramethoxymethyl glycoluril, and dimethoxydiethoxy glycoluril. Useful glycoluril derivatives include for example, mono- and dimethylether of dimethylol glycoluril, the trimethylether of tetramethylol glycoluril, the tetramethylether of tetramethylol glycoluril, tetrakisethoxymethyl glycoluril, tetrakispropoxymethyl glycoluril, tetrakisbutoxymethyl glycoluril, tetrakisamyloxymethyl glycoluril, tetrakishexoxymethyl glycoluril and the like. Glycoluril derivatives can further include dimethylol dihydroxy ethylene urea which is disclosed in U.S. Pat. No. 4,540,735 and incorporated herein by reference.

On a polymer solids weight basis, the blend of polymers comprises broadly between 5% and 50% acrylic copolymer, between 10% and 60% polyester polymer, between 5% and 60% hydroxyl ester epoxy ester diluent and between 20% and 40% amine derivative cross-linking resin. Preferred polymeric blend compositions comprise 15% to 25% acrylic polymer, 20% to 50% polyester polymer, between 10% and 30% hydroxy ester functional epoxy ester diluent and 25% and 35% cross-linker such as aminoplast resin.

In use, the acrylic copolymer containing amounts of primary hydroxyl groups can be used as a grind vehicle for preparing a pigmented vehicle base. Suitable pigments include titanium dioxides, carbon black, cadmiums, yellow, brown, and tan iron oxides as well as other oxide pigments and further include inert fillers such as talcs, clays, and fumed silicas. The acrylic polymer physically wets the titanium dioxide pigment surface for instance and further maintains the pigment in stable dispersion. Up to about six weight parts and typically between about 3.5 and 4 weight parts of pigment can be combined with one weight part of acrylic polymer depending on the adsorbtion properties of the pigment particles. Pigmented coatings typically comprise a pigment to binder ratio of about 1 to 1 for white or light colored paints. Black or dark colored paints may have a pigment to binder ratios as low as 0.5 to 1.0. The preformed acrylic polymer pigment grind can be combined with the polyester polymer, the hydroxyl ester epoxy resin additive, and the amine derivative cross-linking resin.

The merits of this invention are further illustrated by the following examples wherein parts indicated are by weight and temperatures are in centigrade unless otherwise indicated.

EXAMPLE 1

SYNTHESIS OF A HYDROXY FUNCTIONAL EPOXY ESTER REACTIVE DILUENT 307.7 grams of a 95% solution of diglycidyl ether of bisphenol A epoxy of molecular weight=828 (Epon 828—Shell Chemical Company) in xylene is charged to a 1 liter flask equipped with a stirrer, reflux condenser and a thermometer. 307.7 grams of lauric acid and 0.6 grams of triphenyl phosphine is added and the temperature of the reaction mixture is raised to 150° C. The mixture is held at this temperature for 1 hour and then cooled. The final product has a ASTM non-volatile by weight of 96.3, a Gardner-Holt viscosity of Z4+¼ and an acid number of 0.7.

EXAMPLE 2

In a similar fashion, 345 grams of the 95% solution of epoxy resin is mixed with 255 grams of 2-ethylhexanoic acid and 0.6 grams of triphenyl phosphine. The mixture is heated to 120° C. and held for 7 hours. The resulting product has a ASTM non-volatile content of 96.0, a Gardner-Holt viscosity of Z7 and an acid number of 7.0.

EXAMPLE 3

246.1 of the 95% solution of epoxy resin is mixed with 353.9 grams of oleic acid and 0.6 grams of triphenyl phosphine. The mixture is heated at 125° C. for 5 hours followed by 135° C. for 2 hours. The resulting product has a ASTM non-volatile by weight of 98.2, a Gardner-Holt viscosity of Z2 and an acid number of 7.1.

EXAMPLE 4

270 grams of the diglycidyl ether of neopentyl glycol is mixed with 400 grams of lauric acid and 0.6 grams of triphenyl phosphine. The mixture is heated to 150 and held for 1 hour and held at 160° C. for 3 hours. The resulting product has a ASTM nonvolatile content of 97.6, a Gardner-Holt viscosity of K-L, and an acid number of 6.2.

EXAMPLE 5

206.4 grams of dodecenyl succinic anhydride is mixed with 13.9 grams of water. The mixture is heated to 100° C. and held for one hour. 0.6 grams of triphenyl phosphine and 379.6 grams of Cardura E (Shell Chemical Co.) is added and the mixture heated to 150° C. The reaction mixture is held for 1.5 hours at this temperature. The resulting product has a ASTM non-volatile content of 94.9, a Gardner-Holt viscosity of Z6+½ and an acid number of 3.8.

EXAMPLE 6

314 grams of dodecenyl succinic anhydride is mixed with 21 grams of water and heated to 100° C. The mixture is held at this temperature for 1 hour after which 0.5 grams of triphenyl phosphine added. The reaction mixture is cooled to 80° C. and 164 grams of propylene oxide added over 5 hours. The reaction mixture is then held at 80° C. for 6 hours and 100° C. for 7 hours. The resulting product has an ASTM nonvolatile content of 92.4, a Gardner-Holt viscosity of Z1 and an acid number of 21.8.

EXAMPLE 7

402 grams of Empol 1014 dimer fatty acid (Emery Industries) is added to a one liter flask as described above. 0.5 grams of tripheyl phosphine is added and the contents heated to 100° C. 98 grams of propylene oxide is then added over 1.5 hours. The mixture is then held at 80° C. for 40 hours. The final product has an ASTM nonvolatile content of 98.3, a Gardner-Holt viscosity of Y and an acid number of 42.4.

EXAMPLE 8

166.5 grams of azeleic acid is mixed with 433.5 grams of glycidyl neodeonate (Cardura E-10, Shell Chemical Co.) and 0.6 grams of triphenyl phosphine. The mixture is heated to 150° C. and held at this temperature for 2 hours. The final product has an ASTM nonvolatile content of 95.7, a Gardner-Holt bubble tube viscosity of Y+½ and an acid number of 5.7.

EXAMPLE 9

385.6 grams of 12-hydroxystearic acid, 314.4 grams of Cardura E-10 (Shell Chemical Co.) and 0.7 grams of triphenyl phosphine are mixed in a 1 liter flask and heated to 120° C. The mixture is then held at 120° C. for 7 hours. The resulting product has an ASTM nonvolatile content of 94.5, a Gardner-Holt bubble tube viscosity of U-V, and an acid number of 4.7.

EXAMPLE 10

374.4 grams of Empol 1014 trimer/dimer fatty acid (Emery Industries) is mixed with 325.6 grams of Cardura E-10 and 0.7 grams of triphenyl phosphine. The mixture is heated to 120° C. and held at this temperature for 5 hours. The resulting product has an ASTM nonvolatile content of 92.7, a Gardner-Holt bubble tube viscosity of Z3−+⅛, and an acid number of 1.1.

EXAMPLE 11

374.9 grams of Empol 1018 dimer fatty acid (Emery Industries) is reacted with 325.1 grams of Cardura E-10. 0.7 grams of triphenyl phosphine is added to catalyze the reaction. The mixture is heated to 120° C. and held for 7 hours. The final product has an ASTM nonvolatile content of 95.2, a Gardner-Holt bubble tube viscosity of Z2+4/5 and an acid number of 5.5.

EXAMPLE 12

280 grams of dodecenyl succinic anhydride is mixed with 62.2 grams of 1,6 hexanediol and heated to 100° C. The mixture is held at 100° C. for 30 minutes, after which 0.6 grams of triphenyl phosphine and 257.8 grams of Cardura E-10 is added and the mixture heated to 120° C. The mixture is then held at this temperature for 7 hours. The final product has an ASTM nonvolatile content of 97.8, a Gardner-Holt bubble tube viscosity of Z7 and an acid number of 7.5.

EXAMPLE 13

155.4 grams of diglycidyl 2,2-dimethyl-4-methylene glutarate (dimer of glycidyl methacrylate) is reacted with 218.6 grams of lauric acid for 6-½ hours at 140° C. 0.37 grams of triphenyl phosphine is used as a catalyst. The final product has an ASTM nonvolatile content of 95.8, a Gardner-Holt bubble tube viscosity of V-W and an acid number of 3.1.

EXAMPLE 14

322.1 grams of Pripol 1009 dimer fatty acid (Unichema International), 277.9 grams of Cardura E-10 and 0.6 grams of triphenyl phosphine are reacted at 150° C. for 4 hours. The final product has an ASTM nonvolatile content of 93.0, a Gardner-Holt bubble tube viscosity of Z3−+⅛ and an acid number of 2.9.

(Comparative) EXAMPLE 15

Preparation of a High Solids Coating

|  | Weight (Grams) |
|---|---|
| Dispersion Phase | |
| [1]High Solids acrylic | 21.10 |
| Butyl acetate | 13.00 |
| Titanium Dioxide | 100.00 |
| Reduction Phase | |
| [2]High Solids Polyester | 41.38 |
| [3]Cymel 303 Crosslinker | 35.00 |
| [5]Thixotropic gel | 10.26 |
| [6]Surfactant (Dislon L-1980) | 0.55 |
| Ethylene Glycol monobutyl ether acetate | 0.55 |
| n-Butanol | 6.50 |
| Dinonyl naphthaene sulfonic acid | 1.00 |
| Butyl Acetate | 1.35 |

EXAMPLE 16

Preparation of a Modified High Solids Coating

|  | Weight (Grams) |
|---|---|
| Dispersion Phase | |

-continued

| | Weight (Grams) |
|---|---|
| ¹High Solids Acrylic | 21.10 |
| Butyl Acetate | 13.00 |
| Titanium Dioxide | 100.00 |
| Reduction Phase | |
| ²High Solids Polyester | 22.86 |
| Epoxy Ester Reactive Diluent | 16.06 |
| ³Cymel 303 Crosslinker | 35.00 |
| ⁵Thixotropic Gel | 10.26 |
| ⁶Surfactant (Dislon L-1980) | 0.55 |
| Ethylene Glycol monobutyl ether acetate | 0.55 |
| n-Butanol | 6.50 |
| Dinonyl naphthalene sulfonic acid | 1.00 |
| Butyl Acetate | 3.81 |

EXAMPLE 17

Comparison of High Solids and Modified High Solids Coatings

| Coating | Viscosity 80 NV Zahn #2 |
|---|---|
| Example 15 | 45 secs. |
| Example 1 | 37 secs. |
| Example 3 | 40 secs. |
| Example 4 | 35 secs. |
| Example 5 | 37 secs. |
| Example 6 | 33 secs. |
| Example 7 | 32 secs. |

(Comparative) EXAMPLE 18

Preparation of a High Solids Coating

| | Weight (Grams) |
|---|---|
| Dispersion Phase | |
| ¹High Solids Acrylic | 21.10 |
| Butyl Acetate | 13.00 |
| Titanium Dioxide | 100.00 |
| Reduction Phase | |
| ²High Solids Polyester | 41.38 |
| ⁴Cymel 1161 Crosslinker | 35.00 |
| ⁵Thixotropic gel | 10.26 |
| ⁶Surfactant (Dislon L-1980) | 0.55 |
| Ethylene Glycol monobutyl ether aceate | 0.55 |
| n-butanol | 6.50 |
| Dinonyl naphthalene sulfonic acid | 1.00 |
| Butyl Acetate | 1.35 |

EXAMPLE 19

Preparation of a Modified Solids Coating

| | Weight (Grams) |
|---|---|
| Dispersion Phase | |
| High Solids Acrylic | 21.10 |
| Butyl Acetate | 13.00 |
| Titanium Dioxide | 100.00 |
| Reduction Phase | |
| High Solids Polyester | 22.86 |
| Epoxy Ester Reactive Diluent | 16.06 |
| Cymel 303 Crosslinker | 35.00 |
| Thixotropic Gel | 10.26 |
| Surfactant (Dislon L-1980) | 0.55 |

-continued

| | Weight (Grams) |
|---|---|
| Ethylene Glycol Monobutyl ether acetate | 0.55 |
| n-butanol | 5.60 |
| Dinonyl naphthalene sulfonic acid | 1.00 |
| Butyl acetate | 3.81 |

Key for Coating Formulas:
¹The High Solids Acrylic resin is based on the reaction product of Styrene (37.6%), Butyl acrylate (40%), 2-hydroxyethyl acrylate (20%) and Methacrylic acid (2.6)-
²The High Solids Polyester is based on the reaction product of iso-Phthalic acid (30.06 grams), Adipic acid (26.45 grams), Neopentyl Glycol (54.79 grams) and Trimethylol Propane (1.50 grams).
³Cymel 303 is a fully methylated melamine crosslinker from American Cyanamid.
⁴Cymel 1161 is a methylated, iso-butylated melamine crosslinker from American Cyanamid.
⁵Amorphous silica dispersed in the High Solids polyester.
⁶Dislon L-1980 is a proprietary structure from King Industries.

EXAMPLE 20

Comparison of High Solids and Modified High Solids Coatings

| Coating | Viscosity 80 NV, Zahn #2 | Salt Spray (Scribe Creep)$^a$ | Water Fog$^b$ | QUV Gloss Retention$^c$ |
|---|---|---|---|---|
| Example 18 | 40 | 1/8" | No blisters | 59 |
| Example 5 | 33 | 1/8" | No blisters | 56 |
| Example 7 | 29 | 1/8" | No blisters | 57 |
| Example 8 | 30 | 1/8" | No blisters | 65 |
| Example 9 | 26 | 6/32" | No blisters | 59 |
| Example 10 | 28 | 6/32" | No blisters | 57 |
| Example 11 | 27 | 1/8" | No blisters | 57 |
| Example 12 | 38 | 1/8" | No blisters | 57 |
| Example 13 | 33 | 1/8" | No blisters | 67 |
| Example 14 | 35 | 1/8" | No blisters | 57 |

$^a$= 240 hours
$^b$= 1,000 hours
$^c$= 60°, 400 hours

This invention concerns an improved high solids coating composition with low viscosity and good film properties, which is achieved by use of an epoxy ester reactive diluent in a high solids coating. Modification of High Solids coatings with an epoxy ester reactive diluent permits lower viscosity, lower V.O.C., more coating formulation latitude, and equal properties when compared to an unmodified High solids coating. Although the merits of this invention are illustrated and exemplified herein before, the same is not intended to be limiting except by the appended claims.

I claim:

1. A high solids, non-aqueous thermosetting paint coating composition based on a coreactive polymeric binder, the polymeric binder comprising on a weight basis:

between 5% and 50% low molecular weight, hydroxyl functional acrylic copolymer having a hydroxyl number between 50 and 200 and a number average molecular weight between about 500 and 2,500 as measured by GPC;

between 10% and 60% of a linear, low molecular weight hydroxyl functional polyester polymer having a hydroxyl number between 115 and 285 and a number average molecular weight between about 250 and 2,000 as measured by GPC;

between 5% and 60% of a hydroxy ester functional epoxy ester diluent;

between 20% and 40% aminoplast or glycoluril crosslinking component adapted to crosslink upon heating with said acrylic copolymer, said polyester, and said epoxy ester diluent.

2. The composition in claim 1 where the hydroxyl ester functional epoxy ester diluent comprises an ester reaction product of an epoxide functional resin and a carboxylic acid compound.

3. The composition in claim 2 where the epoxide functional resin is selected from epoxy resin, glycidyl functional resins, and alkylene oxide resins.

4. The composition in claim 2 where the epoxide functional resin is an epoxy resin comprising the reaction product of epichlorohydrin and bisphenol-A.

5. The composition in claim 4 where the epoxy resin has a number average molecular weight between about 280 and 1,250 as measured by GPC.

6. The composition in claim 3 where the epoxide functional resin is a glycidyl functional resin of copolymerized ethylenically unsaturated monomers including glycidyl monomer.

7. The composition in claim 3 where the epoxide functional resin is an alkylene oxide resin comprising the reaction product of alkylene oxide and a bisphenol compound.

8. The composition in claim 3 where epoxide functional resin is a monofunctional or difunctional epoxide functional resin.

9. The composition in claim 8 where the epoxide functional resin is coreacted with a monofunctional, difunctional, or polyfunctional carboxylic acid compound to produce the hydroxy ester functional epoxy ester diluent.

10. The composition in claim 1 where the polymeric binder composition comprises by weight between about 15% and 25% said acrylic copolymer, between 20% and 50% said polyester polymer, between 10% and 30% hydroxy ester functional epoxy ester.

11. The composition in claim 1 where the paint contains pigments.

12. The composition in claim 1 where the crosslinking component is an aminoplast.

13. The composition in claim 1 where the crosslinking component is a glycoluril.

* * * * *